US005732271A

United States Patent [19]
Berry et al.

[11] Patent Number: 5,732,271
[45] Date of Patent: Mar. 24, 1998

[54] DATA PROCESSING SYSTEM AND METHOD FOR PROCESSING AN OBJECT ORIENTED DEVELOPMENT ENVIRONMENT EMPLOYING PROPERTY INHERITANCE USING PROTOTYPICAL OBJECTS

[75] Inventors: Richard Edmond Berry, Georgetown; Amitabh Shukla, Round Rock, both of Tex.

[73] Assignee: International Business Machines Corporation, Armonk, N.Y.

[21] Appl. No.: 376,712

[22] Filed: Jan. 23, 1995

[51] Int. Cl.⁶ .......................................... G06F 9/40
[52] U.S. Cl. ..................... 395/683; 395/702; 395/614; 395/50; 364/282
[58] Field of Search ...................... 395/701–712, 395/683, 50, 614; 364/282

[56] References Cited

U.S. PATENT DOCUMENTS

| | | |
|---|---|---|
| 4,558,413 | 12/1985 | Schmidt et al. . |
| 4,719,571 | 1/1988 | Rissanen et al. . |
| 4,864,497 | 9/1989 | Lowry et al. . |
| 4,894,771 | 1/1990 | Kunii et al. . |
| 4,970,658 | 11/1990 | Durbin et al. . |
| 5,093,918 | 3/1992 | Heyen et al. . |
| 5,133,075 | 7/1992 | Risch . |
| 5,136,712 | 8/1992 | Perazzoli, Jr. et al. . |
| 5,187,786 | 2/1993 | Densmore et al. . |
| 5,195,172 | 3/1993 | Elad et al. ................. 395/50 |
| 5,206,951 | 4/1993 | Khoyi et al. . |
| 5,220,657 | 6/1993 | Bly et al. . |
| 5,226,161 | 7/1993 | Khoyi et al. . |
| 5,241,624 | 8/1993 | Torres . |
| 5,263,167 | 11/1993 | Conner, Jr. et al. . |
| 5,493,680 | 2/1996 | Danforth ................. 395/700 |

FOREIGN PATENT DOCUMENTS

| | | |
|---|---|---|
| 0 473 960 A2 | 11/1992 | European Pat. Off. . |
| 2-126340 | 5/1990 | Japan . |
| 3-172942 | 7/1991 | Japan . |
| 3-231352 | 10/1991 | Japan . |
| 4-247526 | 9/1992 | Japan . |

OTHER PUBLICATIONS

Declarative Programming In A Prototype–Instance System: Object–Oriented Programming Without Writing Methods, Brad A. Myers, Dario A. Guiuse, Brad Vander Znden, vol. 27, No. 10, 1 Oct. 1992, pp. 184–200, XP000327298.

*IBM Technical Disclosure Bulletin*, "Object Set Attributes," vol. 27, No. 5, Oct. 1984.

*IBM Technical Disclosure Bulletin*, "Object Area Sharing Rules in Page Composition," vol. 30, No. 2, Jul. 1987, pp. 912–914.

*IBM Technical Disclosure Bulletin*, "Graphical User Interface For Managing Complex Object Trees," vol. 34, No. 11, Apr. 1992, pp. 387–389.

*IBM Technical Disclosure Bulletin* entitled "Distributed Hypertext Links Objects," vol. 34, No. 11, Apr. 1992, p. 61.

*IBM Technical Disclosure Bulletin*, "Graphical User Interface for the Distributed System Namespace," vol. 35, No. 2, Jul. 1992, pp. 335–336.

(List continued on next page.)

*Primary Examiner*—Lucien U. Toplu
*Assistant Examiner*—Majid A. Banankhah
*Attorney, Agent, or Firm*—George E. Clark, Esq.; Jenkens & Gilchrist, PC; Jeffrey S. LaBaw, Esq.

[57] ABSTRACT

A method and system which provides a prototypical object which can be copied to create a derived object. A derived object can contain attribute values or it can hold a reference to its prototypical object. If a required value is not held by the prototypical object, the present invention discloses a scheme by which the object searches up an object hierarchy to find the required attribute. In addition, each object can register an interest in a prototypical object that contains required attributes. If an attribute of a prototypical object changes, the prototypical object informs all registered objects of the change. At runtime, the prototypical object becomes a master object whose attribute values can be changed by the user, changes in master object attributes are propagated to all registered derived objects.

18 Claims, 4 Drawing Sheets

OTHER PUBLICATIONS

*IBM Technical Disclosure Bulletin*, "Implementation of HPFS386 Drive Level Access Control Lists," vol. 36, No. 09A, Sep. 1993, pp. 417–418.

*IBM Technical Disclosure Bulletin*, "Fast Method for Enabling Secondary Inheritance," vol. 36, No. 09B, Sep. 1993, pp. 231–232.

*Object Oriented Design with Applications*, Grady Booch, pp. 25–74, 1991.

DATA PROCESSING SYSTEM AND METHOD FOR PROCESSING AN OBJECT ORIENTED DEVELOPMENT ENVIRONMENT EMPLOYING PROPERTY INHERITANCE USING PROTOTYPICAL OBJECTS

TECHNICAL FIELD OF THE INVENTION

This invention relates in general to data processing systems, and more particularly to data processing systems for processing object oriented developing environments including techniques for propagating values via property inheritance.

BACKGROUND OF THE INVENTION

The operation of a computer system is controlled by a computer program or group of programs called the Operating System ("OS"). In early operating systems, such as UNIX, a computer user input commands to the OS using a command line interface ("CLI"). A typical CLI consisted of a prompt and cursor on the computer screen. The user could issue a command to the operating system by typing the name of a program or command and then pressing an "Enter" key to send this input to the OS. The OS would then process the command and respond accordingly.

Later, more advanced OSs were developed which utilized a graphical user interface ("GUI") in combination with a mouse or other form of pointing and selecting device. In GUIs, the mouse controls a cursor which typically is portrayed as an arrow on the computer screen. In addition, the computer screen is separated into different regions, wherein each region represents different aspects of the computer system like the OS or an application program. The user controls the computer system by using the mouse to move the cursor over a desired region and then selecting a desired operation.

Current state of the art GUIs utilize an object oriented design. The phrase "object oriented" refers to a programming and design method in which program elements are organized as groups of objects, objects are instances of classes, and multiple classes are linked by inheritance relationships. Each class has a set of attributes that define the purpose of that class within the computer system. The organization of the object classes is hierarchical and attributes may be shared and propagated either upward or downward in the hierarchy. For further explanation of object oriented programming and design, the reader is referred to Grady Booch, Object Oriented Design with Applications, pp. 25-74, 1991, which is hereby incorporated by reference.

In object oriented GUIs such as IBM's OS/2®, objects are represented as bitmaps on the computer screen. The background object on which other objects are displayed is called the "desktop." A user manipulates objects by using the mouse to perform actions on them. For example, the user can use the mouse to press a button object or move a window frame object. This type of GUI is preferable because all objects of a particular type are either of the same class or related to each other. Thus, a user can control all of the objects of a particular type by using the same methods, e.g., pressing a button by clicking the mouse over it.

With the advent of object oriented GUIs also came object oriented developing environments ("OODEs"). OODEs are computer programs or groups of programs that allow a software developer to create object oriented programs. OODEs typically have a palette of objects with which the developer builds an application. Each object on this palette is different and serves as a template for the developer. A palette object's attribute settings are the default settings for that object. To use an object on the palette, the developer copies the object and places the copy in the application. The copy of the palette object is called the "derived object." The derived object has the same attribute settings as the original palette object.

If the developer wishes to change a derived object attribute to a different setting than that of the palette object, the developer must call up the property sheet for that object. The property sheet contains a list of all the modifiable attributes for that particular object type. Typical properties for an object include its shape, size, font, color and action when selected. The developer can change objects individually or by selecting a group of objects and then-editing the attributes common to the objects. However, this method of attribute selection is awkward and time consuming. The developer must either spend considerable time editing each object individually or group the objects and risk unintentionally changing certain attributes.

Another problem with prior art OODEs is that the attributes are fixed at the time of development. There is no way to change object attributes after the program has been fully developed and converted into a run-time version. Thus, when a user executes an application developed with an OODE, the attributes of the objects in that application may not match the user's preferences or the attributes of other objects that are on the desktop.

SUMMARY OF THE INVENTION

Thus, it is one object of the present invention to provide a way for an application developer to easily and efficiently change the attributes of application objects.

It is another object of the present invention to provide a way for an application user to easily and efficiently change the attributes of application objects at runtime.

It is yet another object of the present invention to provide a way to closely integrate object oriented applications with the desktop.

The foregoing objects are achieved by a method and system which provides a prototypical object which can be copied to create a derived object. A derived object can contain attribute values or it can hold references to prototypical objects. If a required value is not held by a prototypical object, the present invention discloses a scheme by which the object searches up an object hierarchy to find the required attribute. In addition, each object can register interests in prototypical objects. If an attribute of a prototypical object changes, the prototypical object informs all registered objects of the change. At runtime, the prototypical object becomes a master object whose attribute values can be changed by the user. Changes in master object attributes are propagated to all registered derived objects.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

Figure 1:
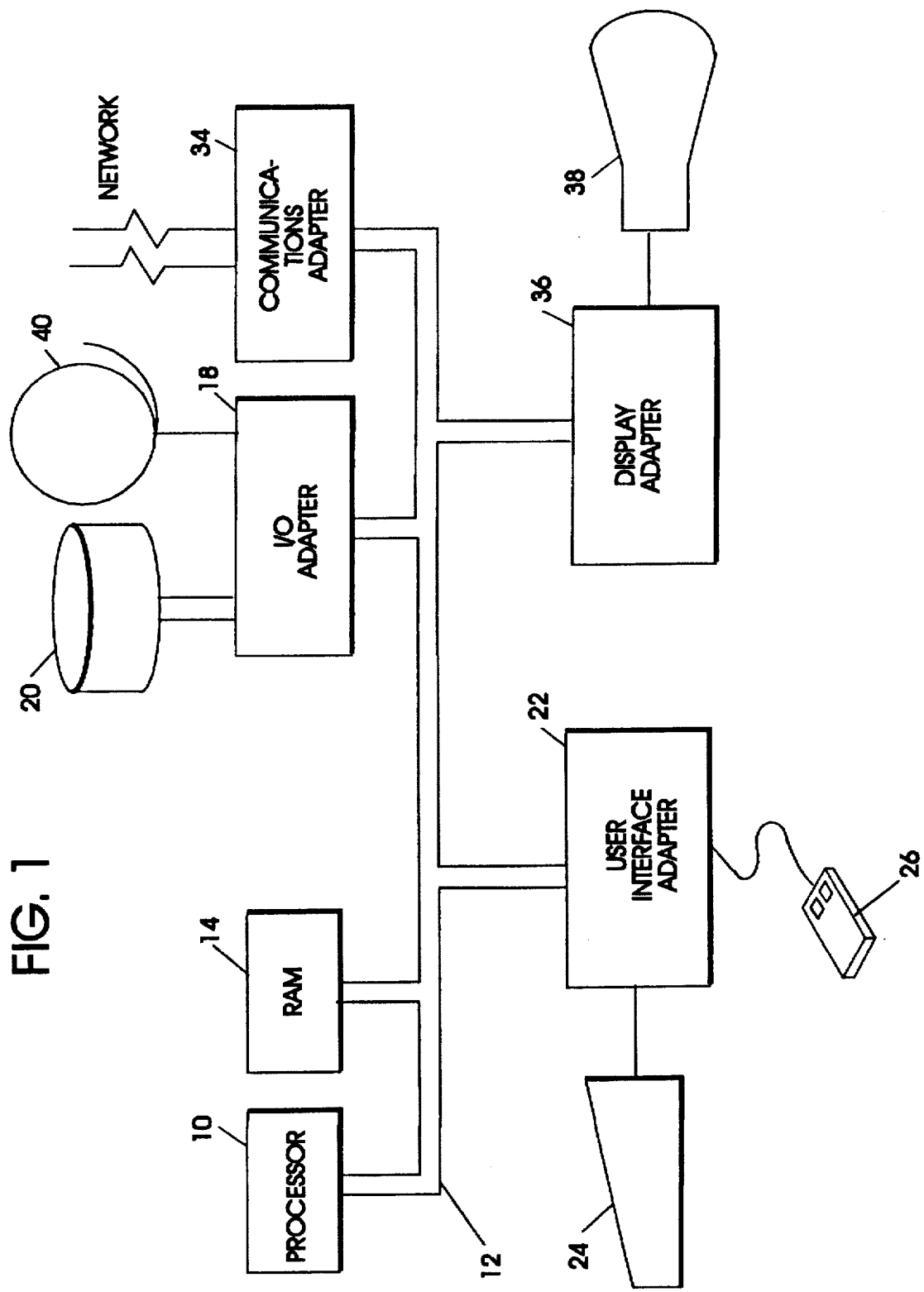
FIG. 1 is a computer system embodying a preferred embodiment of the present invention.

A representative hardware environment for practicing a preferred embodiment of the present invention is depicted in FIG. 1, which illustrates a typical hardware configuration of a workstation in accordance with the subject invention having central processing unit 10, such as a conventional microprocessor, and a number of other units interconnected via system bus 12. The workstation shown in FIG. 1 includes random access memory ("RAM") 14, read only memory ("ROM") 16, and input/output ("I/O") adapter 18 for connecting peripheral devices such as disk units 20 and tape drives 40 to bus 12, user interface adapter 222 for connecting keyboard 24, mouse 26, speaker 28, microphone 32, and/or other user interface devices such as a touch screen device (not shown) to bus 12, communication adapter 34 for connecting the workstation to a data processing network, and display adapter 36 for connecting bus 12 to display device 38.

Figure 2:
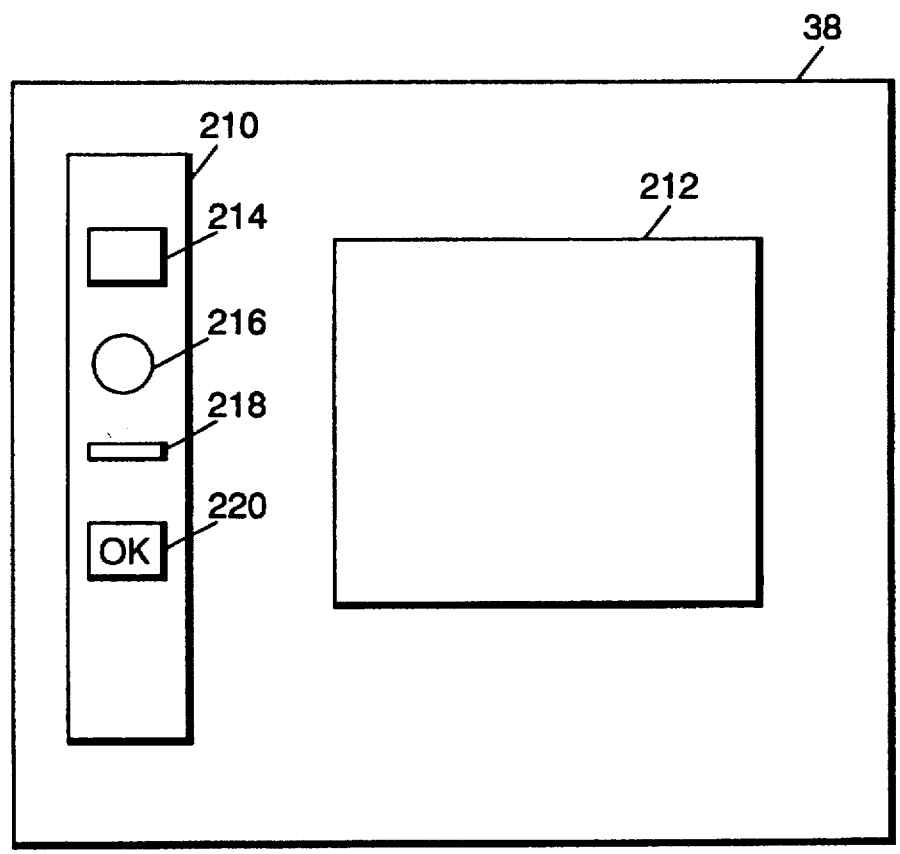
FIG. 2 is a pictorial representation of an object oriented developing environment within a computer screen.

The display of an object oriented developing environment ("OODE") is shown in FIG. 2. Displayed is toolbar 210 containing a palette of objects and "card" 212 onto which the objects can be copied. The objects in the palette include rectangle 214, ellipse 216, text input field 218 and button 220.

Each object 214-220 on toolbar 210 is a prototypical object of a static class. A "class" is an abstract concept meaning a set of objects that share a common structure and behavior. A "static" object is an object whose structure and behavior are fixed. A prototypical object is an instance of a class. That is, the prototypical object has the structure and behavior defined by the class. For a better understanding of object-oriented design and programming, the reader is advised to read the Booch text cited above which has been incorporated by reference.

Each prototypical object 214-220 has one or more attributes. The amount and type of attributes depends on the object's class. For example, button object 220 can contain attributes such as background color, button action and size. Rectangle object 214, on the other hand, can contain attributes such as fill color, contents, border type and size.

Card 212 is the place onto which prototypical objects 214-220 are copied in order to build an object oriented application. A card is also an object. Typical OODEs allow applications to be built from a group of cards, called a "stack." The stack is arranged in a certain order so as to control program flow. Various program objects, such as buttons, bring certain cards to the top of the stack. The card at the top of the stack is displayed to the user on display device 38.

The OODE allows a program developer to create cards and then place objects on the cards. After the developer creates card 212, the developer can copy prototypical objects 214-220 from toolbar 210 onto card 212. These copied objects are called "derived" objects. Derived objects are of the same class and instance as the prototypical object from which they were derived and take all of their attribute information from the prototypical objects.

Both prototypical and derived object attributes can be changed by calling up an attribute sheet for an object or group of objects. The attribute sheet contains a list of the object attributes for that object. If the sheet for a group of objects is called up, only the attributes that are common to the group will be on the sheet. Using this sheet, the user can edit the attribute values of an object.

Attribute sheets are comprised of stacks of card objects like card 212. Each card enables the editing of a specific attribute and is accessed by selecting a tab object located on the card. When the tab is selected, the associated card is brought to the top of the stack. Once the card is on top of the stack, the other objects on the card can be manipulated to set an attribute value.

Figure 3:
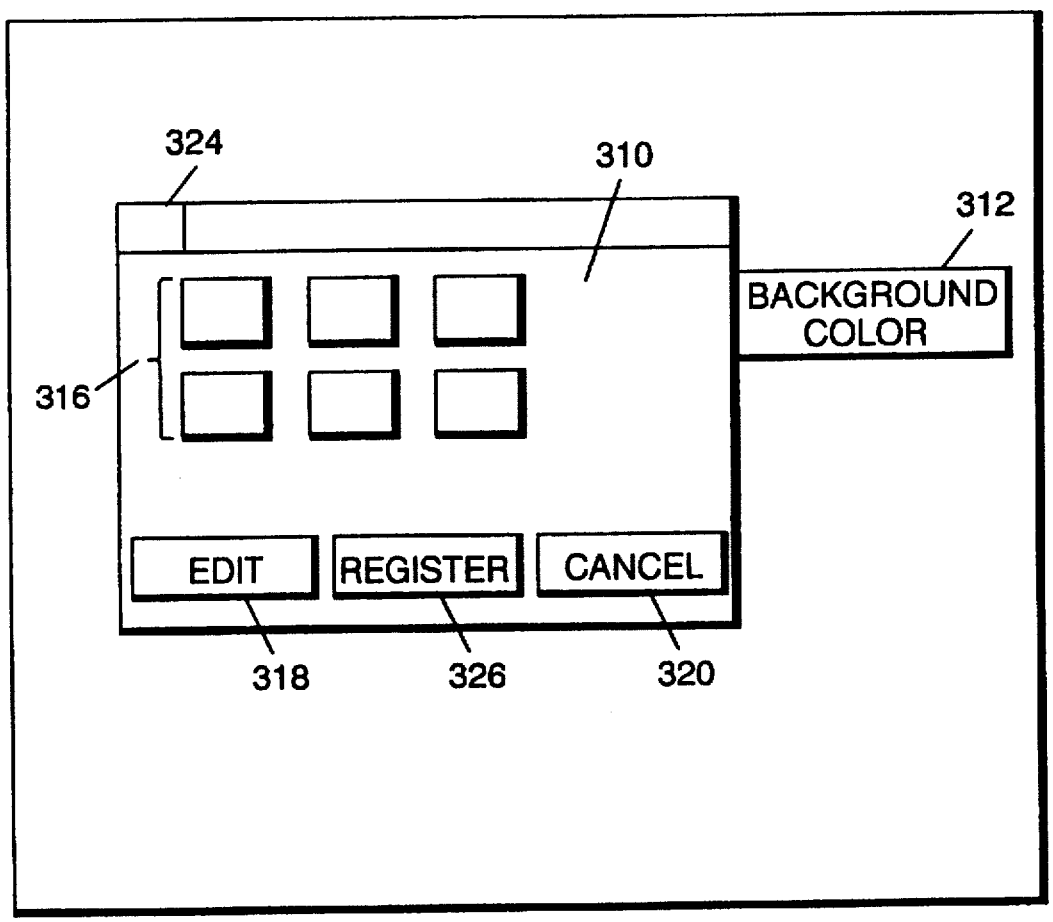
FIG. 3 is a pictorial representation of an attribute sheet for a button object within a computer screen.

FIG. 3 depicts top card 310 of the attribute sheet for button object 220. Button 220 has one attribute: background color. This attribute is indicated by tab 312 associated with the top card 310. To change the background color for button object 220 the developer selects tab 312 on attribute sheet 310, then the developers selects a color from the displayed palette of rectangle objects 316. After a color is selected, the developer can edit the color by pressing button 318, select the color by closing the attribute sheet using window button 324 or cancel the selection by pressing button 320.

Each attribute sheet also has register button 326. The user selects register button 326 to register that particular attribute in a prototypical object. If an attribute is registered in a prototypical object, the user will not be able to edit the other values of the attribute on its tabbed page.

Each prototypical object 214-220 maintains a list of all derived objects which have registered an interest in it. If an attribute value of a prototypical object 214-220 is changed, the new attribute information is passed to all derived objects which are registered in that prototypical object. If a registered derived object has one of the changed attributes, it will update that attribute as necessary.

Figure 4:
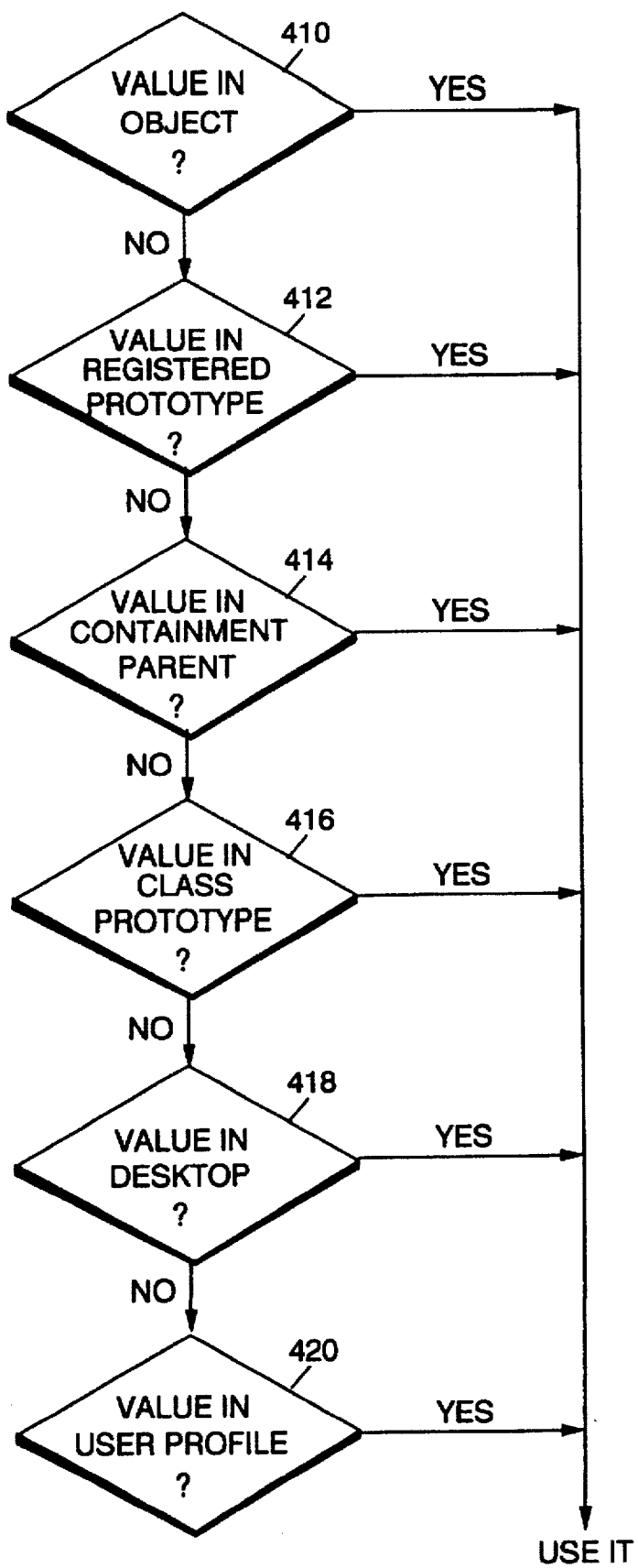
FIG. 4 is a flow chart representing the steps followed when an object searches the object hierarchy for an attribute value.

If the OS or a program requires a derived object's attribute value, that object will search its hierarchy to get the value for that attribute. FIG. 4 is a flowchart which shows how an object will retrieve a required attribute. Initially, at step 410, the object will check itself for the attribute value. At step 412, the object looks to its registered prototype for the attribute value. At step 414, the object looks to its containment parent, e.g., the card containing the object. At step 416, the object looks to the class prototype. At step 418, the object looks to the user's desktop settings. If the attribute value is found in any of the prior steps, the object will use that value. Otherwise, the object will check with the user profile (step 420), which always contains values for all attributes.

The following example shows how a preferred embodiment of the present invention is implemented in the C++ programming language. For a complete understanding of C++, the reader is advised to read M. Ellis & B. Stroustrup, The Annotated C++ Reference Manual, Addison-Wesley Pub. Co., 1990, which is hereby incorporated by reference. The following code describes a class for a button object:

```
*Class Button
    {   public:
            Color GetBackgroundColor();
            void SetBackgroundColor();
            void SetBGColorPrototype();
        private:
            Color fBackground;
            static Button fClassPrototype;
            fBGColorPrototype;
            Button parent;
    };
```

Note that this button contains only one attribute: background color. Of course, in practice a button might have any number of attributes. However, only one is necessary in this example of the present invention. The button has three public functions: GetBackgroundColor(), SetBackgroundColor() and SetBGColorPrototype(). In addition, the button has four private variables: "fBackground," "fClassPrototype," "fBGColorPrototype," and "parent."

The following code describes the class of a prototypical button object:

```
*class ButtonTool
    {   public:
            Button fButtonPrototype;
    };
```

This prototypical object has one public variable: "fButtonPrototype." Because this variable is an object of class Button, it has all of the attributes and variables set out in the above definition of class Button.

In an OODE, an object of class ButtonTool is placed on toolbar 210. This object serves as prototypical button 220. When the developer copies this object for use on card 212, the OODE automatically creates a derived object identical to "fButtonPrototype" and places it on the card (not shown). The derived object has the same attribute values as prototypical button 220.

In class Button, an object's background color is held by the "fBackground" variable. The "SetBackgroundColor()" function sets this variable. The "GetBackgroundColor()" function retrieves an object's background color. If a color value is not held in "fBackground" (step 410), the function looks to the registered prototypical object contained in "fBGColorPrototype" (step 412). Next, the function will look to the object's containment parent as held by the "parent" variable (step 414). After the parent, the function will look to the class prototype as held in "fClassPrototype" (step 416). If none of the objects in those variables contain a background color value, the function will automatically check for a value in the desktop (step 418). If the desktop does not contain a background color, the function will check with the user profile (step 420). The user profile contains a value for every object attribute.

The "SetBGColorPrototype()" function registers an interest in a prototypical object and sets the "FBGColorPrototype" variable. If there is an existing registered prototypical object, it will deregister that interest.

As mentioned above and shown in FIG. 3, the developer can change a derived object's attribute values by editing that object's attribute sheet or by changing an attribute in a registered prototypical object. When an attribute value of a prototypical object is changed, that object causes an "ObjectChangedEvent" message to be sent to all registered objects. The registered derived objects receive this message and update their variables accordingly.

When the developer has finished developing the application, the developer uses the OODE to convert the developed application into a runtime version. During this conversion, the prototypical objects become master objects. The attributes of the master objects can be edited by the application user. This way, a user can easily change the attributes of a particular group of objects by changing the master object. Of course, the user can also change the program objects individually.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A data processing system for processing an object oriented development environment, said system comprising::
   a central processing unit for processing said object oriented development environment;;
   display means for displaying said object oriented development environment;
   an object hierarchy utilizing property inheritance, said object hierarchy associated with said object oriented development environment;
   one or more objects in said object hierarchy;
   a derived object derived from a class parent of said derived object, said derived object in said object hierarchy and having at least one attribute;
   means for said derived object to inherit one or more additional attributes from a second object, wherein said second object is not a class parent of said derived object, and wherein said means includes an attribute sheet associated with said second object; and
   attribute delegation means associated with said derived object and with said means for said derived object to inherit for retrieving one or more values of said one or more additional attributes by searching a search order for said value.

2. The data processing system of claim 1, wherein said search order further comprises a containment parent of said derived object, and wherein said means for said derived object to inherit further comprises means for said derived object to inherit one or more additional attributes from said containment parent.

3. The data processing system of claim 1, wherein said search order further comprises a desktop, and wherein said means for said derived object to inherit further comprises means for said derived object to inherit one or more additional attributes from said desktop.

4. The data processing system of claim 1, further comprising object registration means for registering an interest of said derived object in said second object.

5. The data processing system of claim 1, further comprising conversion means for converting an application developed with said object oriented development environment into a runtime application having master objects.

6. A computer readable medium for controlling an object oriented development environment adapted for execution on a data processing system, said computer readable medium comprising:

an object hierarchy utilizing property inheritance, said object hierarchy associated with said object oriented development environment;

one or more objects in said object hierarchy;

a derived object derived from a class parent of said derived object, said derived object in said object hierarchy and having at least one attribute;

means for said derived object to inherit one or more additional attributes from a second object, wherein said second object is not a class parent of said derived object, and wherein said means includes an attribute sheet associated with said second object; and attribute delegation means associated with said derived object and with said means for said derived object to inherit for retrieving one or more values of said one or more additional attributes by searching a search order for said value.

7. The computer readable medium of claim 6, wherein said search order further comprises a containment parent of said derived object, and wherein said means for said derived object to inherit further comprises means for said derived object to inherit one or more additional attributes from said containment parent.

8. The computer readable medium of claim 6, wherein said search order further comprises a desktop, and wherein said means for said derived object to inherit further comprises means for said derived object to inherit one or more additional attributes from said desktop.

9. The computer readable medium of claim 6, further comprising object registration means for registering an interest of said derived object in said second object.

10. The computer readable medium of claim 6, further comprising conversion means for converting an application developed in said object oriented development environment into a runtime application having a master object.

11. A method of developing an object oriented application adapted for execution on a data processing system, comprising the steps of:

creating an object hierarchy utilizing property inheritance;

creating one or more objects in said object hierarchy;

deriving a derived object from a class parent, said derived object having at least one attribute from said class parent;

inheriting one or more additional attributes for said derived object from a second object, wherein said second object is not a class parent of said derived object, and wherein said inheriting step includes utilizing an attribute sheet associated with said derived object; and searching a search order to retrieve one or more values for said one or more additional attributes of said derived object.

12. The method of claim 11, wherein said search order further comprises a containment parent of said derived object, and wherein said inheriting step further comprises inheriting one or more additional attributes from said containment parent.

13. The method of claim 11, wherein said search order further comprises a desktop, and wherein said inheriting step further comprises inheriting one or more additional attributes from said desktop.

14. The method of claim 11, further comprising the step of registering an interest of said derived object in said second object.

15. The method of claim 11, further comprising the step of converting said application developed with said object oriented development environment into a runtime application having a master object.

16. The data processing system of claim 1, further comprising a user profile, wherein said user profile contains a value for each attribute of said derived object, and wherein said attribute delegation means further comprises means for retrieving a value of said one or more additional attributes by searching said user profile.

17. The computer readable medium of claim 6, further comprising a user profile, wherein said user profile contains a value for each attribute of said derived object, and wherein said attribute delegation means further comprises means for retrieving a value of said one or more additional attributes by searching said user profile.

18. The method of claim 11, further comprising creating a user profile, wherein said user profile contains a value for each attribute of said derived object, and wherein said searching step further comprises retrieving a value of said one or more additional attributes by searching said user profile.

* * * * *